(12) United States Patent
Medvedev

(10) Patent No.: US 10,647,574 B2
(45) Date of Patent: May 12, 2020

(54) METHOD AND SYSTEM OF OZONE GENERATION

(71) Applicant: DM ECO Plasma, Inc., Fort Worth, TX (US)

(72) Inventor: Dmitry Medvedev, Fort Worth, TX (US)

(73) Assignee: DM ECO Plasma, Inc., Fort Worth, TX (US)

(*) Notice: Subject to any disclaimer, the term of this patent is extended or adjusted under 35 U.S.C. 154(b) by 0 days.

(21) Appl. No.: 16/286,083

(22) Filed: Feb. 26, 2019

(65) Prior Publication Data

US 2019/0218096 A1 Jul. 18, 2019

Related U.S. Application Data

(63) Continuation-in-part of application No. 15/872,086, filed on Jan. 16, 2018, now abandoned.

(51) Int. Cl.
*C01B 13/10* (2006.01)
*H05H 1/24* (2006.01)
*H05H 1/34* (2006.01)
*C01B 13/11* (2006.01)

(52) U.S. Cl.
CPC .............. *C01B 13/10* (2013.01); *C01B 13/11* (2013.01); *H05H 1/2406* (2013.01); *H05H 1/34* (2013.01); *C01B 2201/22* (2013.01); *C01B 2201/62* (2013.01); *C01B 2201/64* (2013.01); *C01B 2201/66* (2013.01); *C01B 2201/72* (2013.01); *C01B 2201/76* (2013.01); *H05H 2001/2412* (2013.01); *H05H 2001/2431* (2013.01); *H05H 2245/121* (2013.01)

(58) Field of Classification Search
None
See application file for complete search history.

(56) References Cited

U.S. PATENT DOCUMENTS

| 5,879,641 A * | 3/1999 | Conrad | C01B 13/115 |
| | | | 422/186.07 |
| 2002/0039546 A1* | 4/2002 | Lee | C01B 13/11 |
| | | | 422/186.07 |
| 2011/0027139 A1* | 2/2011 | Otero | C01B 13/115 |
| | | | 422/186.15 |

* cited by examiner

*Primary Examiner* — Kishor Mayekar
(74) *Attorney, Agent, or Firm* — Bardmesser Law Group

(57) ABSTRACT

An ozone generator includes a discharge chamber; an inlet opening for feeding air into the discharge chamber; an outlet opening for removing ozone from the discharge chamber; and at least two cylindrical electrode sets in the discharge chamber. Each electrode set includes a ground electrode; a high voltage electrode; a dielectric between the ground electrode and the high voltage electrode; the dielectric separated from the ground electrode by a first discharge gap, and the dielectric separated from the high voltage electrode by a second discharge gap. A high voltage power supply provides a voltage impulse to the high voltage electrode of at least 2 kV (at least 5 kV is most cases), and a peak current of at least 1 ampere (at least 4 amperes in most cases). The high voltage power supply provides a dU/dt of the voltage impulse of between 5 kV/μsec and 50 kV/μsec.

17 Claims, 11 Drawing Sheets

METHOD AND SYSTEM OF OZONE GENERATION

CROSS REFERENCE TO RELATED APPLICATIONS

This application is a continuation in part of U.S. patent application Ser. No. 15/872,086, filed on Jan. 16, 2018, incorporated herein by reference in its entirety.

BACKGROUND OF THE INVENTION

Field of the Invention

The invention relates to ozone generation using an oxygen containing gas in an impulse plasma barrier discharge.

Description of the Related Art

Ozonation is an extremely effective technology for decontamination of water, air rooms and food products. For example, typical energy costs for decontamination of 1 ton of water or 100 m$^3$ of air is approximately 10 W*hours or 0.1 cent.

Ozonation is green technology because ozone has limited lifetime and automatically decompose after decontamination process. Reaction products of ozone are incomparably safer then reaction products of chlorine, which are poisonous and cancerogenic. Thus, there is considerable economic and health-related motivation in replacing chlorine use in the food industry with ozone.

Despite the evident advantages of ozone technology, application of ozone in food industry is not widespread, because of significant operation problems of ozone generating equipment. In the case of utilization of regular air ozone generator, the problem is that the air from which the ozone is generated, along with the oxygen, also contains nitrogen and water vapor. The electric discharge in the ozone generator chamber not only dissociates the oxygen molecules, generating ozone, but also dissociates the nitrogen molecules, generating atomic nitrogen, which is then transformed into nitric oxides, and then, when it reacts with water, into nitric acid. The nitric acid quickly forms a conductive film on the surface of the dielectric barrier discharge (DBD) ozone generator electrodes, which results in failure of the generator's normal operation.

Oxygen ozone generators have the same problems because the rest of nitrogen and water vapors exist in oxygen as admixtures.

This problem is the reason why, in order to operate regular ozone generators, deep drying of working gas is needed in the ozone generator's discharge chamber. Ideally, an ozone generator can start operation only when dew point inside discharge chamber will reach −70° C. This process needs several hours, or sometimes a few days, but only in this case can the ozone generator work stably for a long time. Such operation requirements are usually unacceptable for operation on a real plant, and ozone generators usually start operations before reaching such a low dew point. In this case, the lifetime of ozone generators decrease because of nitric acid deposition on electrode surfaces. Ozone generator's capacity drops and after some time cleaning or changing of electrodes becomes necessary.

One new approach is described in Russian patent RU 2357921. This ozone generator intends for generation of ozone directly from atmospheric non-dried air by using of new special form of pulse DBD (PDBD).

FIG. 1 shows a schematic of the ozone generator of RU 2357921. The generator includes:
1—discharge chamber
2, 3—entrance and exiting opening
4—dielectric
5—high voltage electrodes
6—ground electrodes
7—discharge gap
8—power supply for high voltage impulse
9—impulse high voltage transformer
10—generator of impulses FIG. 2 shows current and voltage waveforms of the ozone generator of RU 2357921. In FIG. 2:
11—asymmetric voltage impulse
12—current impulse
13—head of current streamer
14—secondary streamer The device of FIG. 1 functions as follows:

Non-dry air goes into the pipe into the discharge gap 9 formed between the high voltage electrode 5 and ground electrode 6. When voltage impulse appears on electrodes 5, it creates electric barrier discharge and the discharge ignites on the front of the negative part of the impulse because positive part of impulse at least in two times less than negative. The maximum rate of increase of the negative part of an impulse is at least 5 kV/μs and up to 50 kV/μs, while the electric discharge is ignited by only the front of the negative part of the high voltage impulse. The stationary temperature of the high voltage electrodes in working conditions of the device is at least 40° C.

Conventional DBD ozone generation equipment needs continuous control and service, which increases operating costs and has problems with reliability. Accordingly, a new ozone generator design that addresses these shortcomings, is needed.

SUMMARY OF THE INVENTION

The present invention is directed to a PDBD ozone generator that has substantially wider application region than conventional art and has important technical advantages.

In one aspect, there is a provided a device for generation of ozone in the impulse barrier discharge that includes the discharge chamber with entrance and exit openings with high voltage electrodes grounded and covered by dielectric material inside of it. The power supply connected to the electrodes and generating high voltage impulses is located outside of the chamber. The discharge chamber is different from described prototype used for non-dried atmospheric air. In this case discharge gap can be divided on two parts between high voltage electrode and dielectric and between dielectric and grounded electrode. In both gap parts ignites the impulse barrier discharge with. The applied voltage should have rate of increase of voltage in a region 5 kV/μs and up to 50 kV/μs. Voltage pulses can be positive, negative or bipolar, rather than asymmetric impulses with maximum amplitude of the negative part of the impulse is at a minimum twice higher than the positive part of the impulse used in prototype. Ozone generator supplied by the dry air or oxygen or non-dried air through the entrance opening which then goes through discharge gaps between high voltage and ground electrodes rather then only non-dried air like prototype. The technical result of the invention is considerable increase in reliability of the device, an increase in the amount of generated ozone, lowering of specific energy expenditures, and elimination of air preparation in the case of using non-dried air.

An approach used for generation of ozone from non-dried atmospheric air can be used also for generation of ozone from dry air or oxygen. As with regular DBD ozone generators, deep drying the ozone generator's discharge chamber is needed. Ideally, an ozone generator can start operation only when dew point inside discharge chamber will reach −70° C. This process needs several hours, or sometimes a few days, but only in this case regular DBD ozone generator can work stably for a long time. Use of PDBD ozone generator, which can operate without any drying of air or oxygen, can solve this problem.

In another embodiment, an ozone generator includes a discharge chamber; an inlet opening for feeding air into the discharge chamber; an outlet opening for removing ozone from the discharge chamber; and at least two cylindrical electrode sets in the discharge chamber. Each electrode set includes a ground electrode; a high voltage electrode; a dielectric between the ground electrode and the high voltage electrode; the dielectric separated from the ground electrode by a first discharge gap, and the dielectric separated from the high voltage electrode by a second discharge gap. A high voltage power supply provides a voltage impulse to the high voltage electrode of at least 2 kV (at least 5 kV is most cases), and a peak current of at least 1 ampere (at least 4 amperes in most cases). The high voltage power supply provides a dU/dt of the voltage impulse of between 5 kV/μsec and 50 kV/μsec.

Optionally, the electrode/dielectric structure may planar instead of tubular/cylindrical/coaxial.

The first and second discharge gaps may be the same, or they may be different. Optionally, the first discharge gap is between 0.1 mm and 10 mm. Optionally, the second discharge gap is between 0.1 mm and 10 mm. Optionally, the high voltage power supply provides a bipolar voltage impulse to the high voltage electrode of at least −5 kV on a negative portion of the bipolar voltage impulse and at least +5 kV on the positive portion of the impulse. Optionally, a FWHM duration of the negative portion of the bipolar voltage impulse is 0.3-30 μsec. Optionally, a FWHM duration of the positive portion of the bipolar voltage impulse is 0.3-30 μsec. Optionally, the first and second ground electrodes, the high voltage electrode and the first and second dielectrics are coaxial. Optionally, in each electrode set, the ground electrode, the high voltage electrode and the dielectric are coaxial. Optionally, a frequency of the impulses is 1.0-2.0 KHz if ozone generator operated on non-dried or dry air. Optionally, the ozone generator generates the ozone from dry air. Optionally, the ozone generator generates ozone from non-dry air. Optionally, a stationary temperature of the high voltage electrode during operation is at least than 40° C.

In one embodiment, a frequency of the impulses is 5-6 KHz generates ozone from dry air.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The proposed invention allows for any types of ozone generation work with a minimal generation of nitrogen oxides and nitric acid. To accomplish this, the new type of ozone generators based on PDBD has been developed, and this design proved to be efficient. These ozone generators used similar effects as in RU 2357921, but with a different physical structure and under significantly different conditions, including opposite polarity of a high voltage pulse. Physical aspects of the phenomenon of pulse DBD with prolonged current pulse were also studied in sufficient detail for a better understanding of the process.

The main goal of this development was to remove strict limitations of a voltage waveform used for PDBD ignition, which are characteristic for the prototype ozone generator. Generation of significantly asymmetric voltage impulses is not convenient for operation with a discharge chamber with a high electric capacitance, which is characteristic for oxygen and dry air ozone generators. To solve this problem conditions of existing analogues electric discharge waveform were found for the positive polarity of voltage as well. Creating a PDBD with elongated current pulse on both voltage polarities offers a possibility to use bipolar voltage pulses, which are more convenient for ozone generators with high electric capacitance of the discharge chamber.

Figure 1:
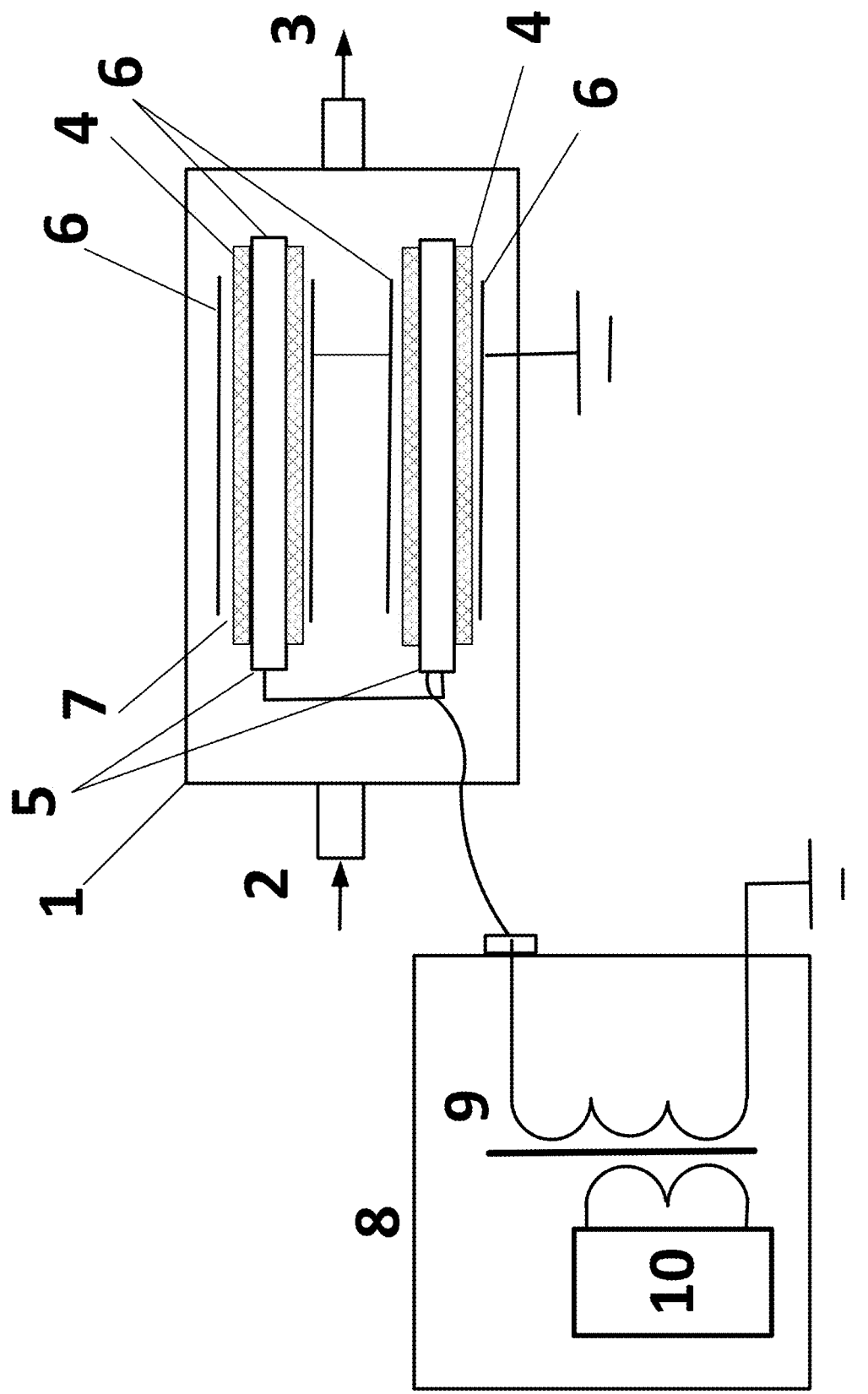
FIG. 1 shows a schematic of a conventional ozone generator.
Figure 2:
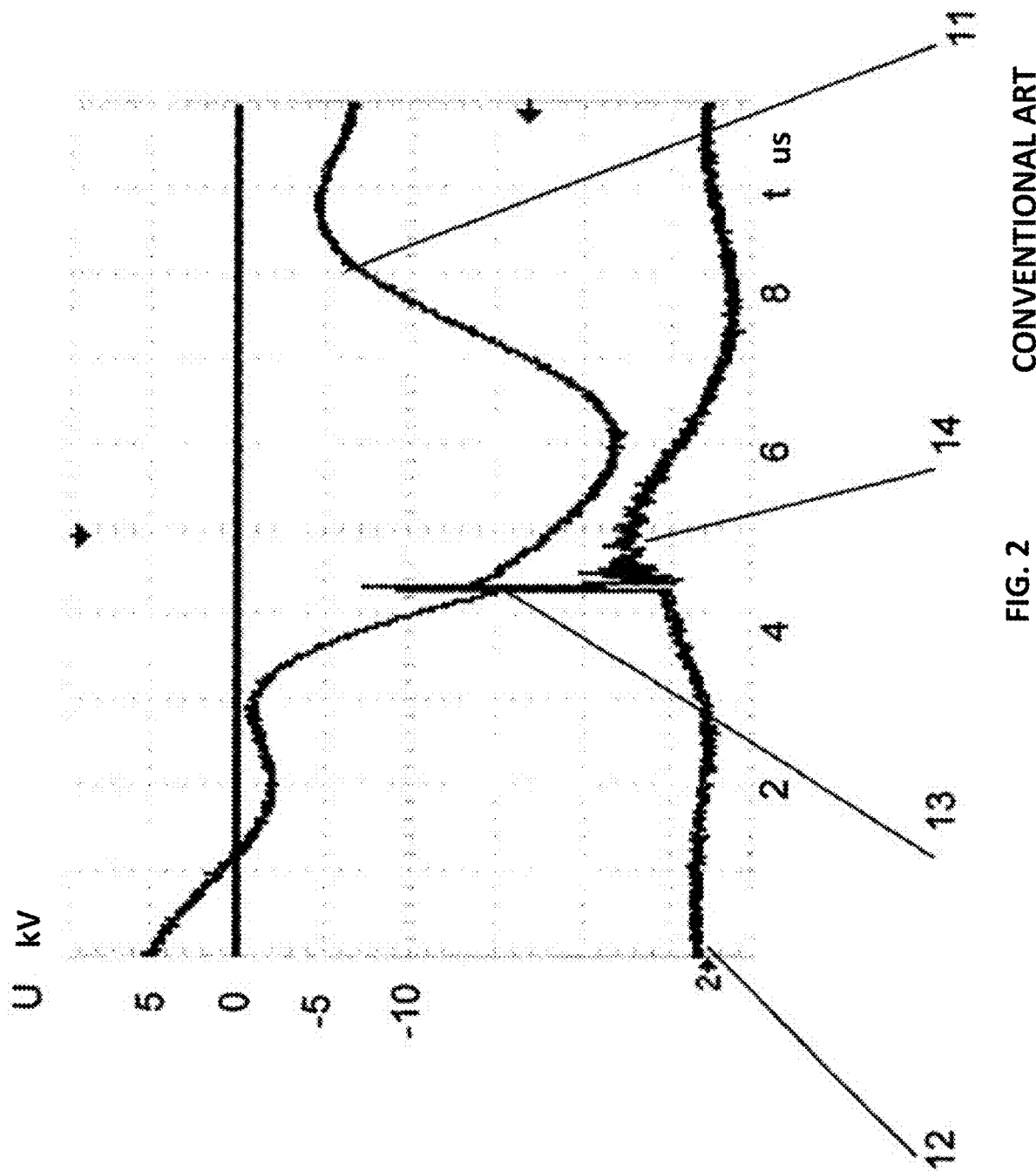
FIG. 2 shows current and voltage waveforms of the conventional ozone generator.
Figure 3:
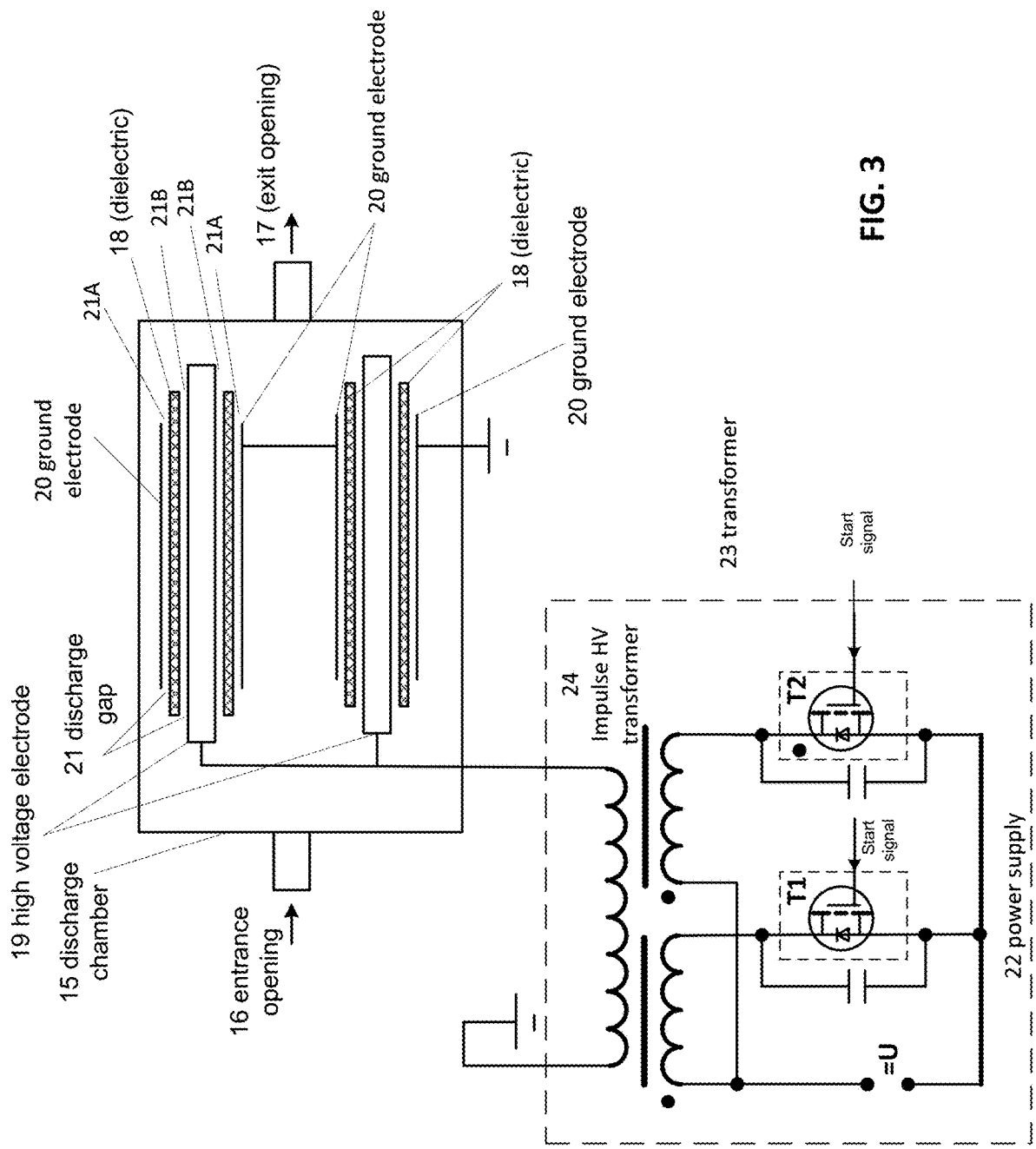
FIG. 3 shows a schematic of the proposed ozone generator.
Figure 11:
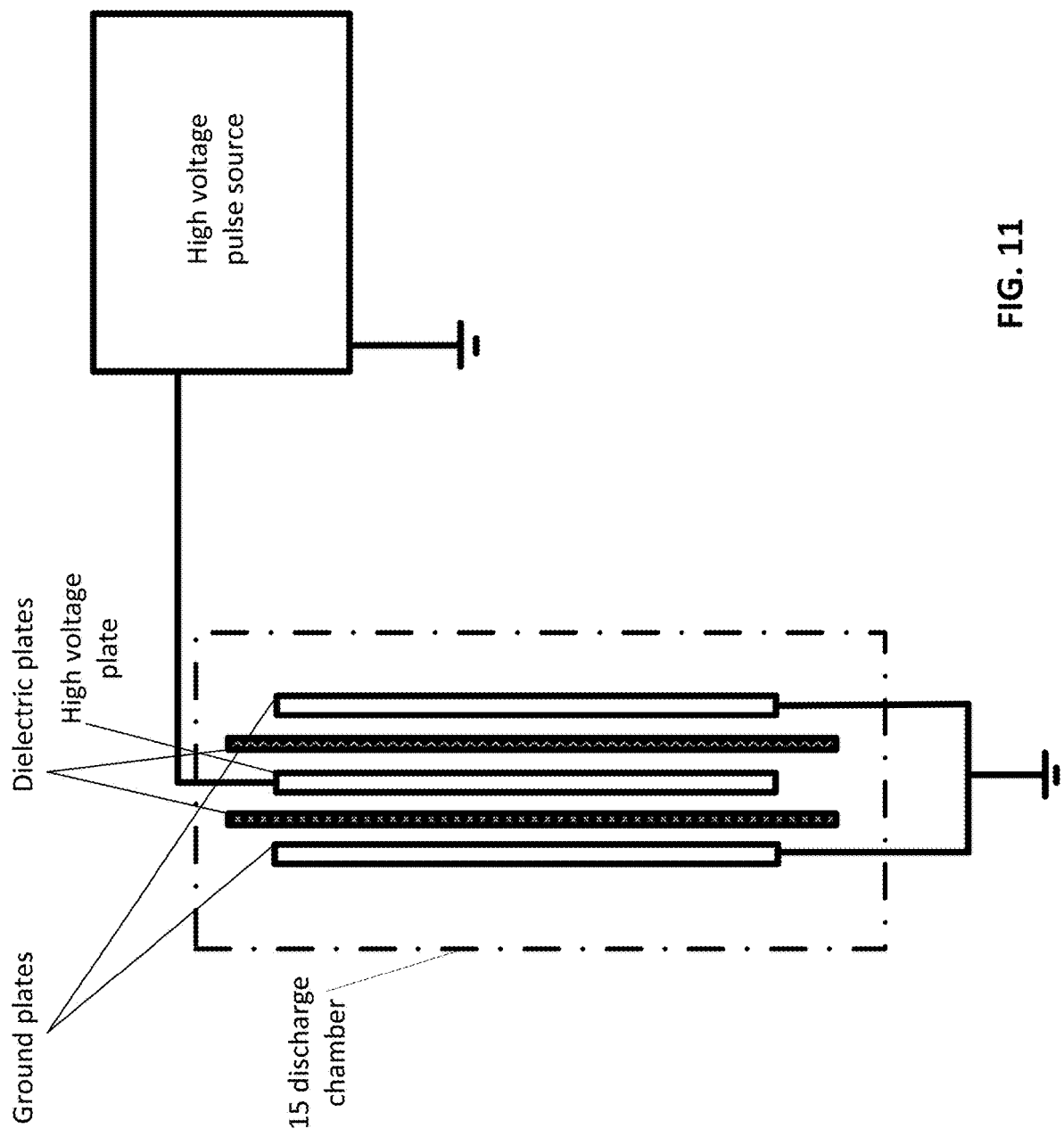
FIG. 11 shows an ozone generator of the present invention with a planar arrangement of the electrodes.

FIG. 3 shows a schematic of the proposed ozone generator. The generator includes:

15—discharge chamber (shown in cross-section, the chamber and its internal components are generally tubular-coaxial, although a planar arrangement is also possible, see FIG. 11)

16, 17—entrance and exit opening

Two cylindrical electrode structures, each of which includes:

18—dielectric

19—high voltage electrodes

20—ground electrodes

21—discharge gaps (labeled 21A, 21B, which may be the same or may be different)

22—power supply for high voltage impulse

23—generator of impulses based on at least two transistors (such as field effect transistors, bipolar transistors or insulated gate bipolar transistors) connected with primary windings of high voltage transformer transistors are shorted by capacitors with capacitance 10 nf-300 nf for creation of desirable voltage risetime optimal for ozone generation and limitation of peak voltage. With these parameters, the high voltage power supply has transformer leak inductance $L_{sc}$ and an ozone capacitance $Cap_{oz}$ according to 0.03 Hn*gram per hour of ozone<$Cap_{oz}*L_{sc}$<3Hn*gram per hour of ozone, so as to provide a dU/dt of the voltage impulse of between 5 kV/μsec and 50 kV/μsec.

24—impulse high voltage transformer which has at least two primary windings which have own ferrite core and secondary winding which is common for all ferrite cores of primary windings to provide desirable high voltage rise time.

Figure 4:
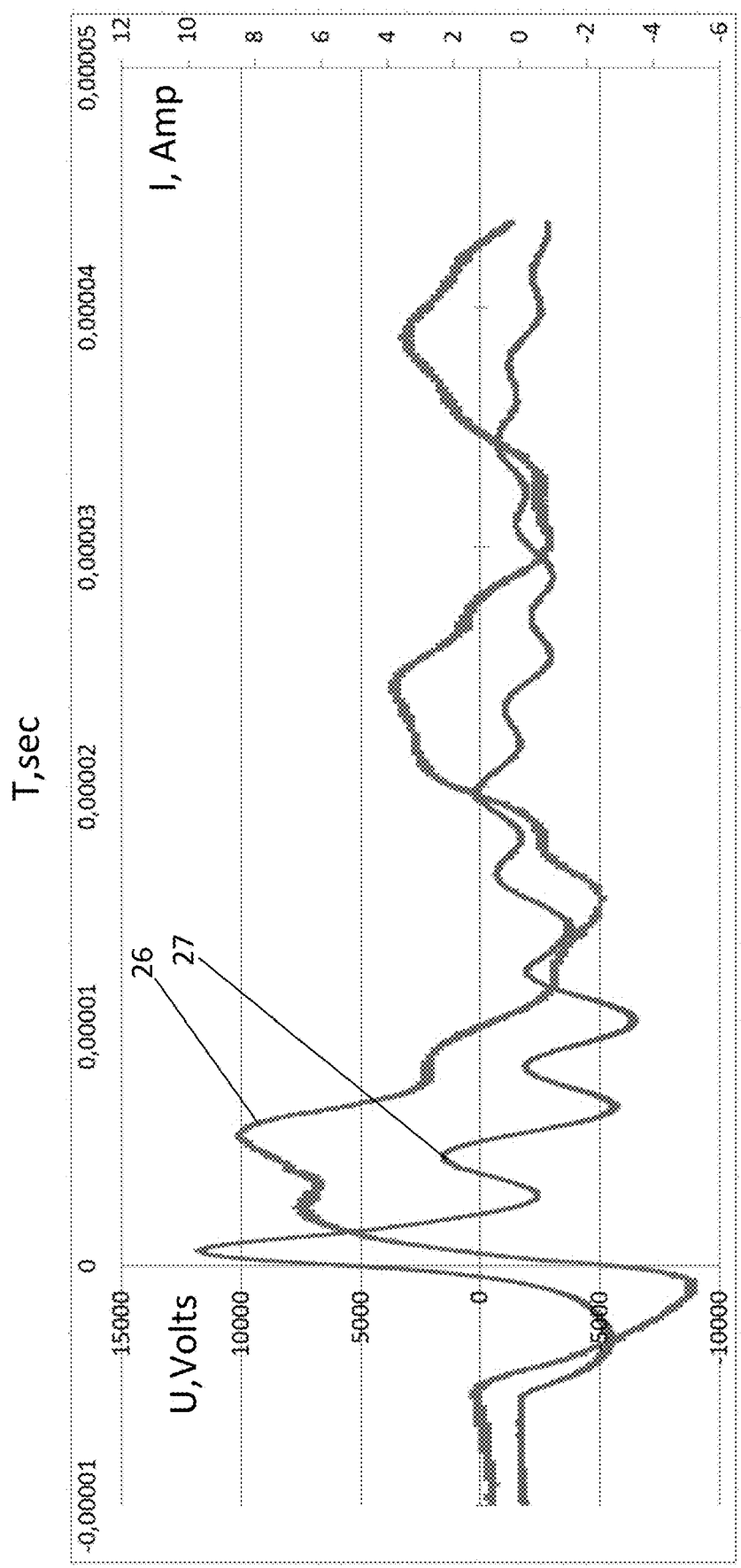
FIG. 4 shows current and voltage waveforms of for the proposed ozone generator.

FIG. 4 shows current and voltage waveforms of the proposed ozone generator. In FIG. 4:

26—voltage impulse waveform of proposed ozone generator.

27—current impulse waveform of proposed ozone generator. As can be seen from this figure, the voltage waveform is significantly closer to bipolar.

Figure 5:
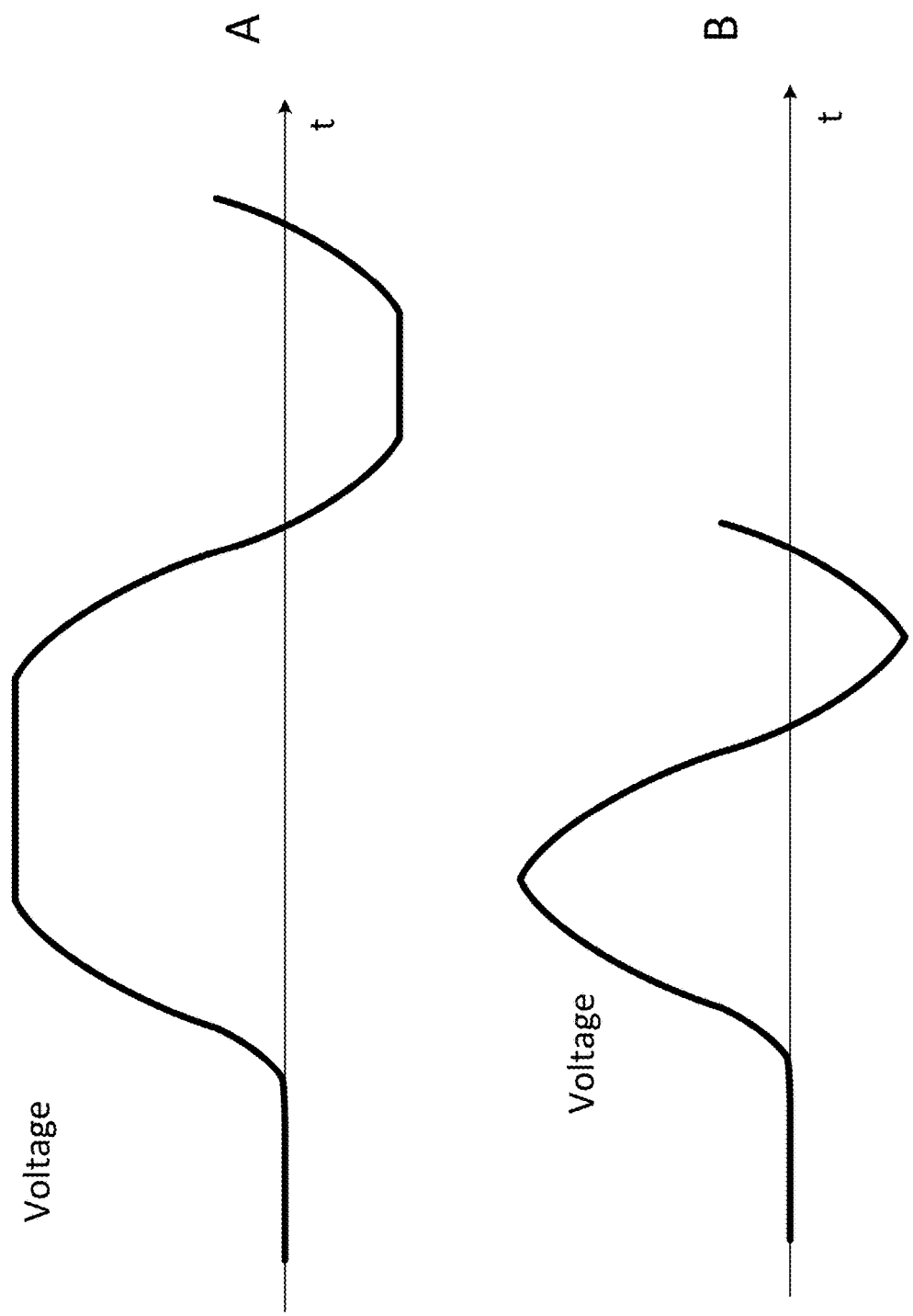
FIG. 5 shows alternative voltage waveforms for the proposed pulsed DBD.

In this case it is primarily the rise and fall time of voltage that are important. Both waveforms (A) and (B) in FIG. 5 give approximately the same result, independent of difference in pulse shapes.

Demonstration of the fact that a positive part of voltage characteristic still corresponds to PDBD form with elongated current is presented by analysis of a process below.

Figure 6:
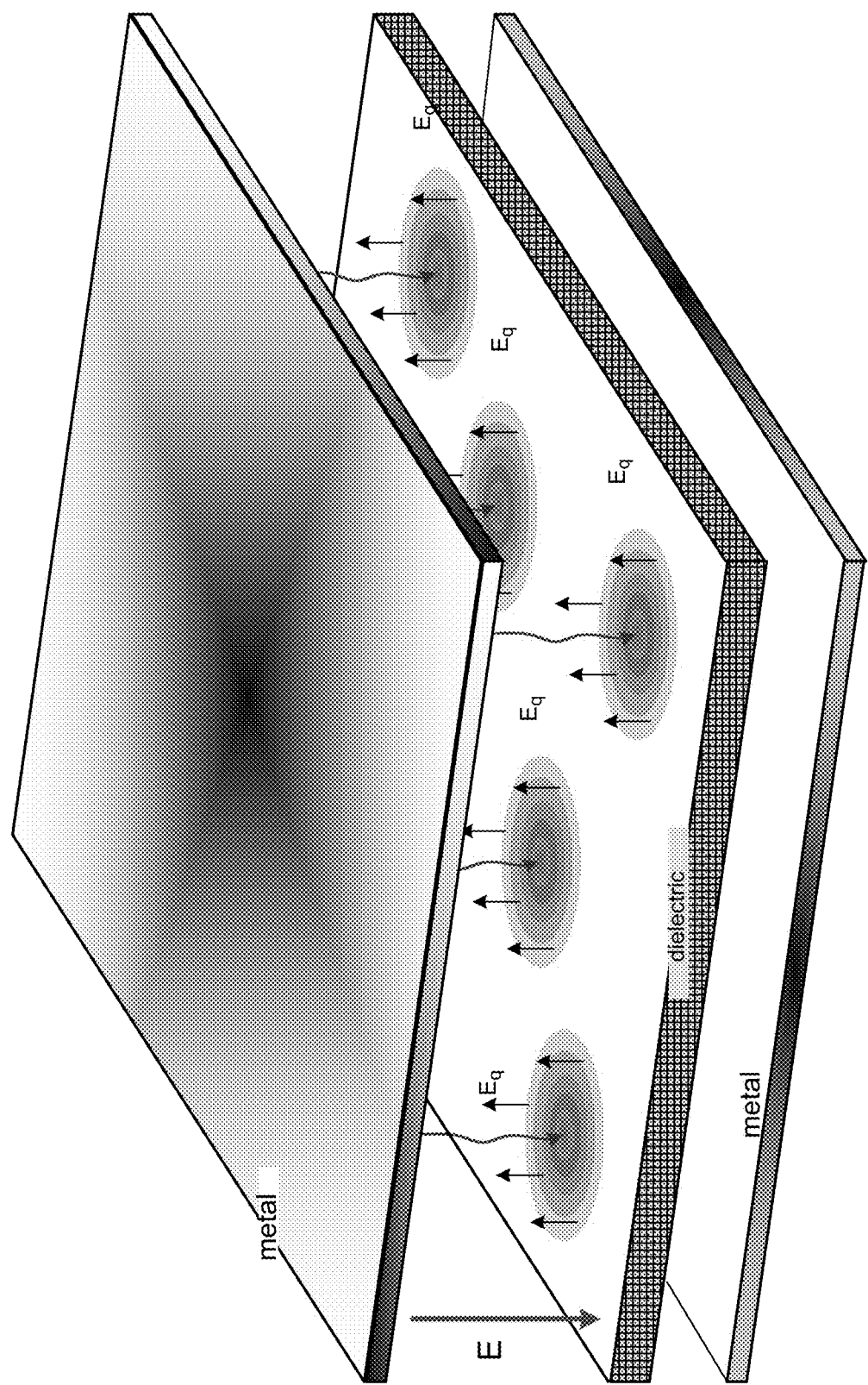
FIG. 6 shows a schematic structure of the DBD.

FIG. 6 shows a schematic structure of the streamer DBD. A voltage impulse initiates the breakdown and streamers are formed in the air gap between the electrodes. The streamers transfer charge on parts of dielectric and a region of sliding discharge appears at streamer arrival site, thus charging part of the surface. The charge on the surface of dielectric screens the applied electric field, reducing it. By way of example, the streamers shown in this figure are about 0.8-1.2 mm diameter.

Figure 7:
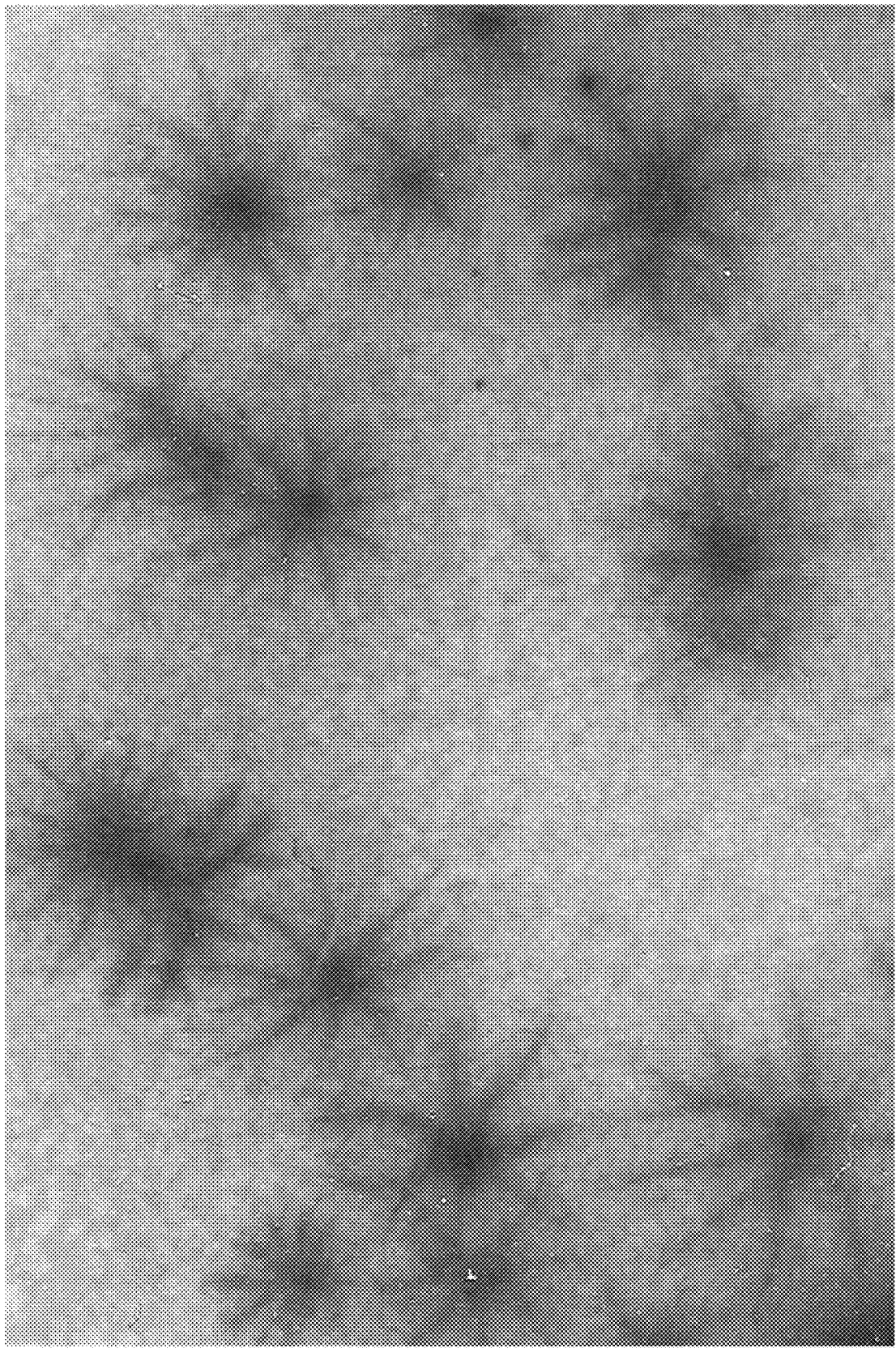
FIG. 7 shows an image on the film covered by light sensitive material place on the surface of dielectric.

FIG. 7 shows an image on the film covered by light sensitive material place on the surface of dielectric. As may be seen in FIG. 7, the trace of streamers of sliding discharge on the surface of dielectric obtained by use of a light sensitive film.

This structure is characteristic for any type of streamer DBD. The difference between a regular DBD and PDBD with elongated current pulse is determine by further evolution of the streamer after crossing the discharge gap.

Figure 8:
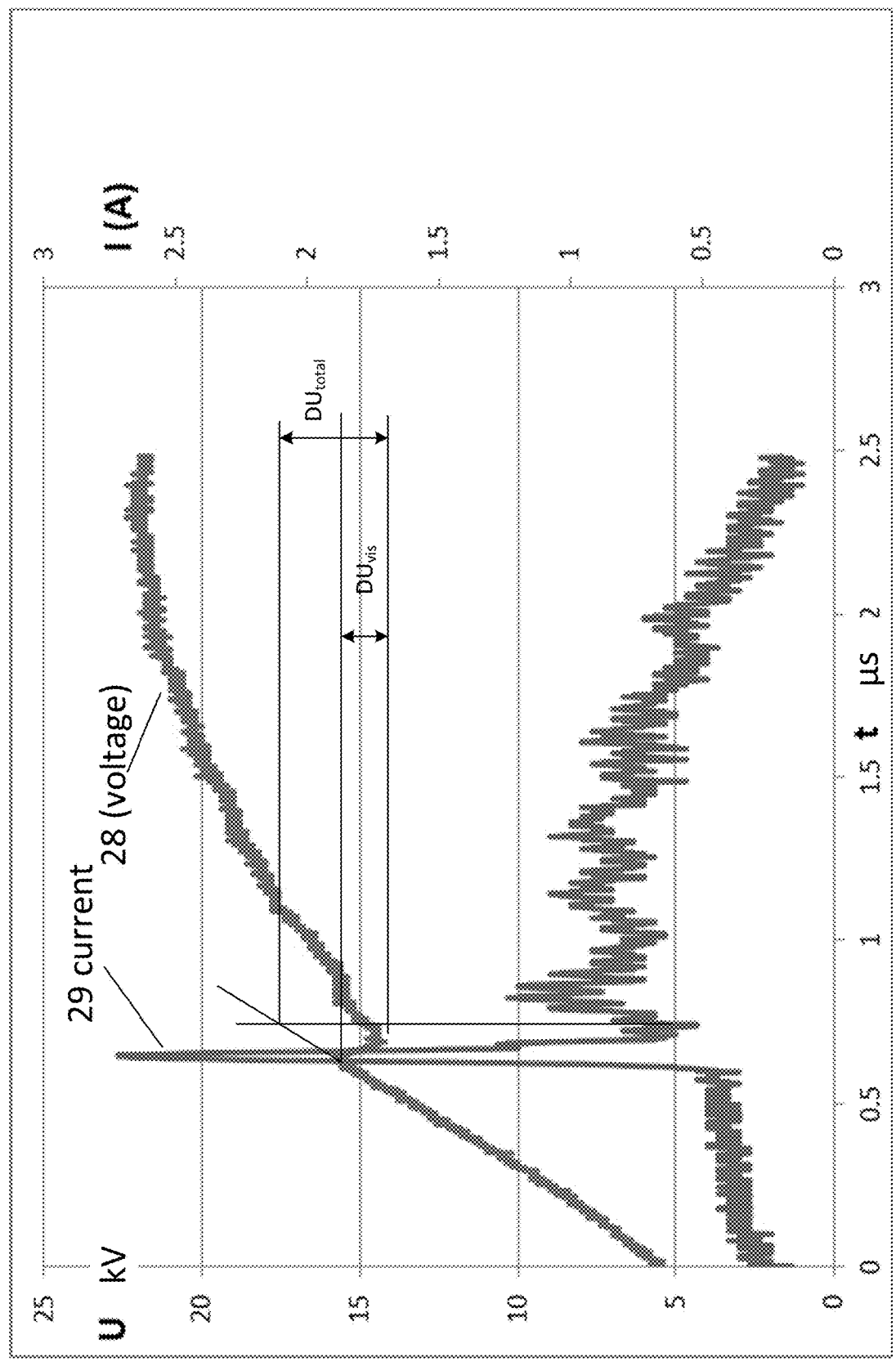
FIG. 8 shows waveforms of discharge current and voltage of PDBD corresponded to the positive voltage.

FIG. 8 shows waveforms of discharge current and voltage of PDBD corresponding to the positive voltage. The curves were obtained in experiments by the inventor. In this figure, 28 is the voltage impulse waveform, and 29 is the current impulse waveform. It can be observed in the graph that the discharge is unusual and considerably differs from die traditional DBD. Instead of distributed in time streamers forming a typical "terrycloth" on the current waveform, one can see a quick and powerful impulse. It looks as if the streamers pass and cover the discharge gap almost synchronously and current. To analyze this, it is useful to calculate the capacitance current component $I_c = dU/dt * C_{discharge}$.

The capacitance of the entire discharge system consists of air and quartz gaps C=25 pF before the breakdown, with t (of the breakdown)=0.65 μs. As $C_{discharge}$ is only the capacitance of quartz gap C (of Q)=140 pF after the time t (of the breakdown) will be taken.

Figure 9:
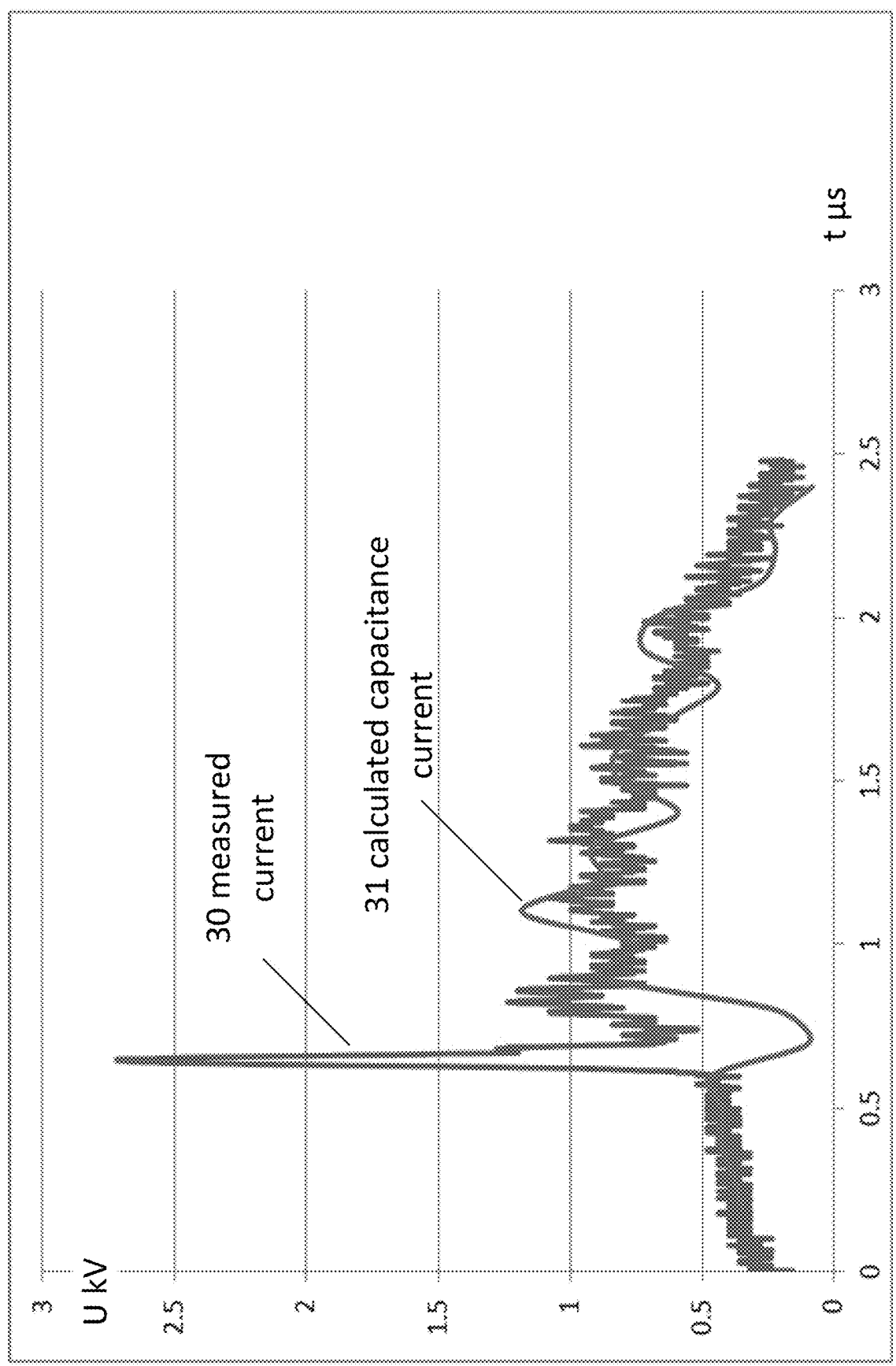
FIG. 9 shows a waveform of the discharge current and calculated capacitance current corresponded to the positive voltage.

The results of the calculations are presented in FIG. 9, which shows a waveform of the discharge current and calculated capacitance current. In FIG. 9, 30 is the measured current waveform, and 31 is the calculated capacitance current waveform. Before the time $t_{breakdown}$=0.65 μs the capacitance of the discharge system $C_{discharge}$ is chosen as the capacitance of system consisting of air and quartz gap C=25 pF, while after $t_{breakdown}$ the $C_{discharge}$ is taken only as the capacitance of only quartz gap $C_{quartz}$=140 pF.

Good correspondence of calculated and observed currents before and after the breakdown can be observed in FIG. 9. This correspondence shows that before the breakdown the capacitance of the whole discharge system was really equal the whole capacitance of consisting of air and quartz gap, as it should be. The fact that after the breakdown the capacitance current corresponds to the capacitance of the of the discharge system consisting only of quartz capacitor shows that voltage and, respectively, the electric field after the breakdown are constant and do not contribute to the derivative of voltage.

This can be explained by the fact that after the heads of all the streamers covered the discharge gap (and this happened almost synchronously) the plasma channels in the gap continued to exist. As it happens, the stationary electric field necessary for maintaining plasma in the channels conducting the current, which continues flowing during the process of voltage increase in the discharge system, stays practically constant. The waveforms in FIG. 8 permit estimating this field.

Let's consider the moment of voltage drop in the discharge system corresponding to the breakdown moment when streamers pass the discharge gap. The breakdown occurs when the voltage in the discharge system is $U_{discharge}$=15.8 KV. Knowing the capacitances $C_{quartz}$ and $C_{air}$ it is possible to calculate the voltage and the average electric field in the air discharge gap $E_{air\ breakdown}$. This value is about 28 kV/cm, which is close to the breakdown electric field for air (maximum electric field at that is somewhat higher than the breakdown field).

The voltage drop when streamers are passing through the air gap testifies to the increase of electric capacitance at the moment. If at the beginning this capacitance was C=25 pF, and the voltage drop was DU (here, the real value was used, and not the DU observed, with the correction, accounting for the process of streamers passing, while the charging of the discharge system continued) then after passing of streamers the capacitance increased by the factor of $DU/U_{breakdown}$, or to the value of $C_{new}$=30.4 pF. Since the capacitance of the quartz gap did not change, the change in the capacitance is caused by the change of the capacitance of the air gap up to the value $C_{air\ new}$=C (new)*C (quartz)/(C (quartz)−C (new))=38.8 pF.

Thus the average electric field in the air gap dropped by the factor of C (air)/C (air new)=0.8 down to the value E (residual)=22.4 KV/cm, and then stayed constant.

Figure 10:
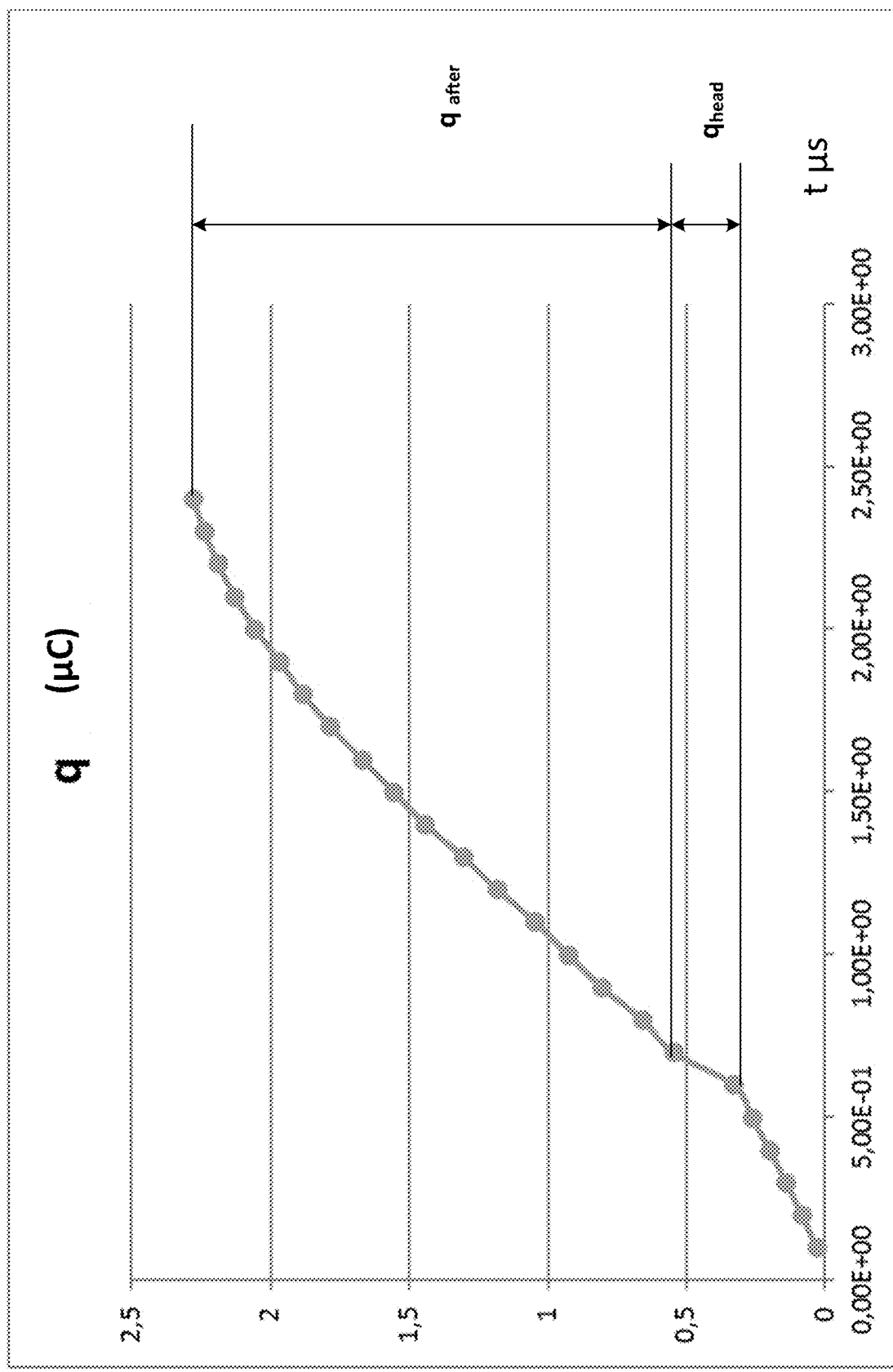
FIG. 10 shows an integral of the discharge current or the passed charge corresponded to the positive voltage.

FIG. 10 shows a dependence of passed charge on time. The obtained values of the electric field at the moment of passing streamers and right after that permit to estimate energy input at the stage of the streamer's head and at the following stage of the discharge. The integral of the discharge current or the passed charge is therefore presented in FIG. 10 and as a result we can see that in this form of discharge 90% of energy input correspond to the moment after head of the streamer pass discharge gap.

This demonstrates that considered electric discharge is PDBD with elongated current pulse, rather than regular DBD. This effect has been reached with a positive voltage rather than with negative like in prototype. So a PDBD with elongated current pulse is possible with both positive and negative voltages and possible with bipolar voltage also, if the voltage increase rate dU/dt is optimal.

One of the most important outcomes of this appears selective dissociation of molecules contained in air in such a discharge. At optimal electric field of about 20 kV/cm, the energy of the electrons is optimal for the dissociation of oxygen molecules, which is about 5 eV, and for synthesis of ozone, but is insufficient for dissociation of the nitrogen molecules with energy of about 10 eV and for synthesis of oxides of nitrogen. In this case it is possible to raise the temperature in the discharge zone without degrading the productive capacity of the ozone generator, something entirely impossible for conventional ozone generators. The temperature increase permits to significantly improve the longevity of the generator and its reliability, while eliminating the problem of nitrogen acid and higher oxides condensation inside the discharge chamber.

The experiment shows that, because of low electric field, and with the degree of selectivity achieved, one can dissociate the molecules of oxygen without much influence on the molecules of water and nitrogen. This result can be reached not only with negative voltage but with positive and bipolar voltage also.

Example #1

The source of high voltage impulses generates impulses with a frequency f of about 1500 Hz (generally, from about 1 KHz to about 2 KHz). The form of the impulse is illustrated in FIG. 4.

The front of increase of the first negative peak is 0.5 µs at an amplitude 5 kV. Thus, the rate of increase dU/dt of the negative peak of the impulse is 10 kV/µs. Maximum amplitude of positive peaks is 8.5 kV with a rise time 0.5 µs so the rate of increase dU/dt is 17 kV/µs. The source of high voltage impulse is attached to high voltage electrodes of the cylindrical shape and diameter 12 mm inserted into the quartz pipe with inner diameter 12 mm and outer diameter 15 mm. High voltage electrodes and quartz pipe inserted to the discharge chamber with air cooling system for the outside grounded electrodes with inner diameter 17 mm. The electric gas barrier discharge ignites between the quartz pipe and grounded electrodes. The power is monitored in the experiment. A stationary temperature of the high voltage electrodes 19 of the discharge chamber 15 is about 60° C.

Non-dried atmospheric air, whose amount varies in the course of the experiment, goes through the discharge gap. The ozone was generated in the discharge chamber the concentration of which is registered at the exit of the discharge chamber. This way the energy consumption is registered at the level of 20-30 W/g when ozone concentration at the exit opening of the ozone generator is 3-10 g/m³. Such an ozone generator was inspected after working without interruptions and without servicing for about 2 years, and had no residual deposits on the electrodes and retained stable characteristics.

Example #2

The source of high voltage impulses generates impulses with a frequency f of about 1500 Hz. The shape of the impulse is also close to that illustrated in FIG. 4.

The front of increase of the first negative peak is 0.5 µs at an amplitude 7 kV. Thus, the rate of increase dU/dt of the negative peak of the impulse is 14 kV/µs. The maximum amplitude of positive peaks is 10 kV with a rise time 0.5 µs so the rate of increase dU/dt is 20 kV/µs. The source of high voltage impulse is attached to high voltage electrodes of the cylindrical shape and diameter 10 mm inserted to the quartz pipe with inner diameter 12 mm and outer diameter 15 mm. The high voltage electrodes and the quartz pipe are inserted to the discharge chamber with a water cooling system for the outside grounded electrodes with inner diameter 17 mm. So, in this example, discharge gap has been divided into two parts. The electric gas barrier discharge ignites between the quartz pipe and grounded electrodes and between the high voltage electrode and quartz pipe at the same time. The power is monitored in the experiment. A stationary temperature of the high voltage electrodes 19 of the discharge chamber 15 is about 40° C.

Dry oxygen atmospheric air goes through the discharge gaps, whose amount varied in the course of the experiment. The ozone was generated in the discharge chamber, whose concentration is registered at the exit of the discharge chamber. This way the energy consumption is registered at the level of 10-12 W/g when the ozone concentration at the exit opening of the ozone generator is 30-100 g/m³. Such an ozone generator working 8 hours a day interactions without servicing for about 3 years was inspected, and had no residual deposits on the electrodes and retained stable characteristics.

FIG. 11 shows an ozone generator of the present invention with a planar arrangement of the electrodes. Although only three planar electrodes are shown in this figure, the concept can be extended to more electrodes, stacked into a sandwich-like structure with dielectrics in between, and with discharge gaps, similar to what is shown in FIG. 11.

It should also be appreciated that various modifications, adaptations, and alternative embodiments thereof may be made within the scope and spirit of the present invention. The invention is further defined by the following claims.

What is claimed is:

1. An ozone generator, comprising:
   a discharge chamber;
   an inlet opening for feeding air into the discharge chamber;
   an outlet opening for removing ozone from the discharge chamber;
   at least two cylindrical electrode sets in the discharge chamber, each electrode set including
   a ground electrode,
   a high voltage electrode,
   a dielectric between the ground electrode and the high voltage electrode,
   the dielectric separated from the ground electrode by a first discharge gap, and the dielectric separated from the high voltage electrode by a second discharge gap;

an impulse high voltage transformer has at least two primary windings each with its own ferrite core and a secondary winding that is common for all ferrite cores of the primary windings;

an impulse generator based on at least two transistors that are connected to the primary windings of the impulse high voltage transformer;

the two transistors shorted by capacitors with capacitance 10 nF 300 nF; and a power supply configured to provide a voltage impulse to the high voltage electrode of at least 2 kV, and a peak current of at least 1 ampere, and to provide a dU/dt of the voltage impulse of between 5 kV/μsec and 50 kV/μsec.

2. The ozone generator of claim 1, wherein the first and second discharge gaps are the same.

3. The ozone generator of claim 1, wherein the first and second discharge gaps are different.

4. The ozone generator of claim 1, wherein the first discharge gap is between 0.1 mm and 10 mm.

5. The ozone generator of claim 1, wherein the second discharge gap is between 0.1 mm and 10 mm.

6. The ozone generator of claim 1, wherein the high voltage power supply provides a bipolar voltage impulse to the high voltage electrode of at least −5 kV on a negative portion of the bipolar voltage impulse and at least +5 kV on a positive portion of the bipolar voltage impulse.

7. The ozone generator of claim 6, wherein a FWHM (full width half maximum) duration of the negative portion of the bipolar voltage impulse is 0.3-30 μsec.

8. The ozone generator of claim 6, wherein a FWHM (full width half maximum) duration of the positive portion of the bipolar voltage impulse is 0.3-30 μsec.

9. The ozone generator of claim 1, wherein, in each cylindrical electrode set, the ground electrode, the high voltage electrode and the dielectric are coaxial.

10. The ozone generator of claim 1, wherein a frequency of the voltage impulse is 1.0-2.0 KHz.

11. The ozone generator of claim 1, wherein the ozone generator generates the ozone from dry air.

12. The ozone generator of claim 1, wherein the ozone generator generates ozone from non-dry air.

13. The ozone generator of claim 1, wherein a stationary temperature of the high voltage electrode during operation is at least 40° C.

14. The ozone generator of claim 1, wherein a frequency of the voltage impulse is 5-6 KHz.

15. An ozone generator, comprising:

a discharge chamber;

an inlet opening for feeding air into the discharge chamber;

an outlet opening for removing ozone from the discharge chamber;

a first flat ground electrode and a second flat ground electrode in the discharge chamber;

a flat high voltage electrode between the first and second flat ground electrodes;

a first dielectric between the first flat ground electrode and the high voltage electrode and separated by discharge gaps from both the first flat ground electrode and the high voltage electrode;

a second dielectric between the second flat ground electrode and the high voltage electrode and separated by discharge gaps from both the second flat ground electrode and the high voltage electrode;

an impulse high voltage transformer has at least two primary windings each with its own ferrite core and a secondary winding that is common for all ferrite cores of the primary windings;

an impulse generator based on at least two transistors that are connected to the primary windings of the impulse high voltage transformer;

the two transistors shorted by capacitors with capacitance 10 nF-300 nF; and a power supply configured to provide a voltage impulse to the high voltage electrode of at least 2 kV, and a peak current of at least 1 ampere, and to provide a dU/dt of the voltage impulse of between 5 kV/μsec and 50 kV/μsec.

16. The ozone generator of claim 15, wherein the high voltage power supply provides a bipolar voltage impulse to the high voltage electrode of at least −5 kV on a negative portion of the bipolar voltage impulse and at least +5 kV on a positive portion of the bipolar voltage impulse.

17. The ozone generator of claim 15, further comprising additional flat ground electrodes, additional flat high voltage electrodes and additional dielectrics stacked in a sandwich-like structure and parallel to the first flat ground electrode and the second flat ground in the discharge chamber, and in the same arrangement with discharge gaps therebetween.

* * * * *